L. BRILES.
VEHICLE WHEEL.
APPLICATION FILED JUNE 30, 1916.
1,198,696.
Patented Sept. 19, 1916.
2 SHEETS—SHEET 1.
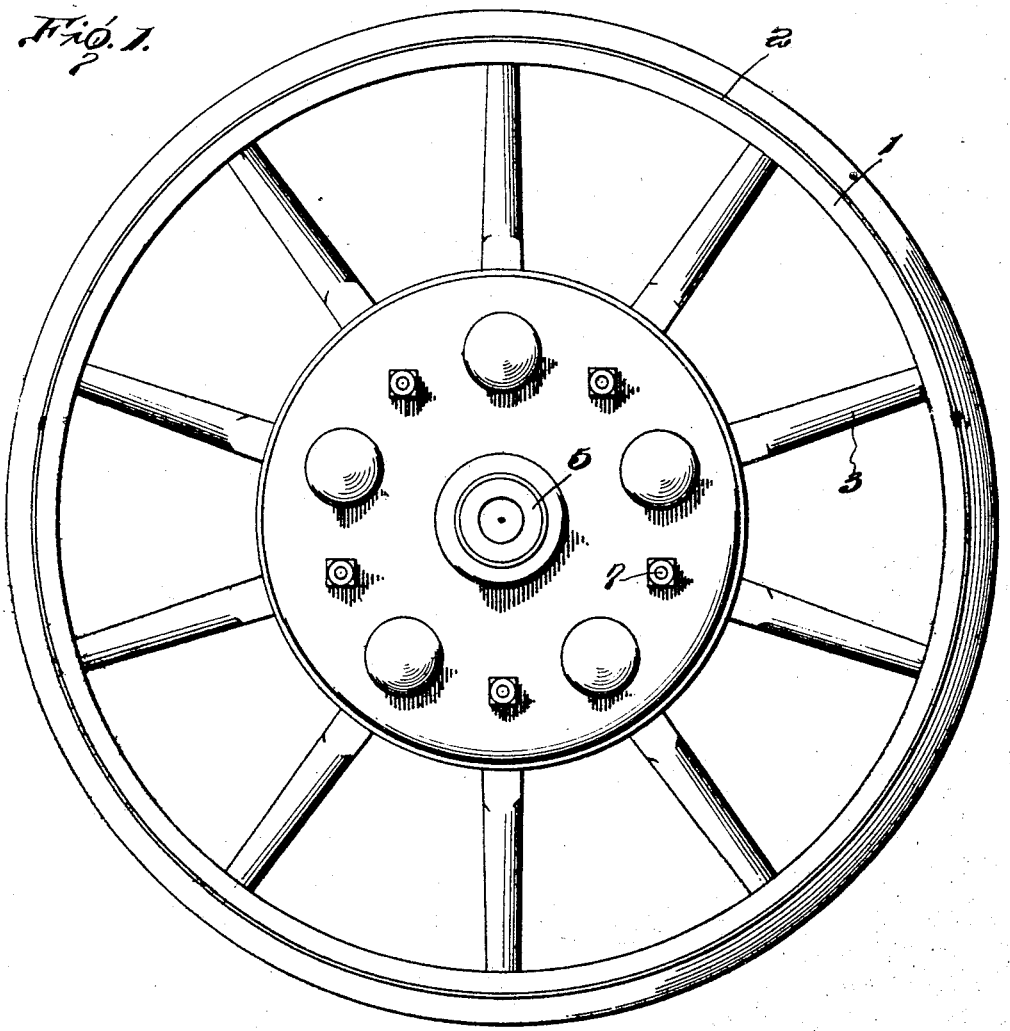
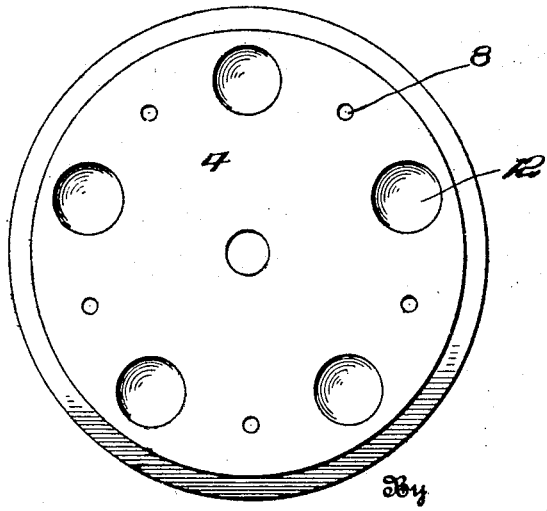
Inventor
L. Briles

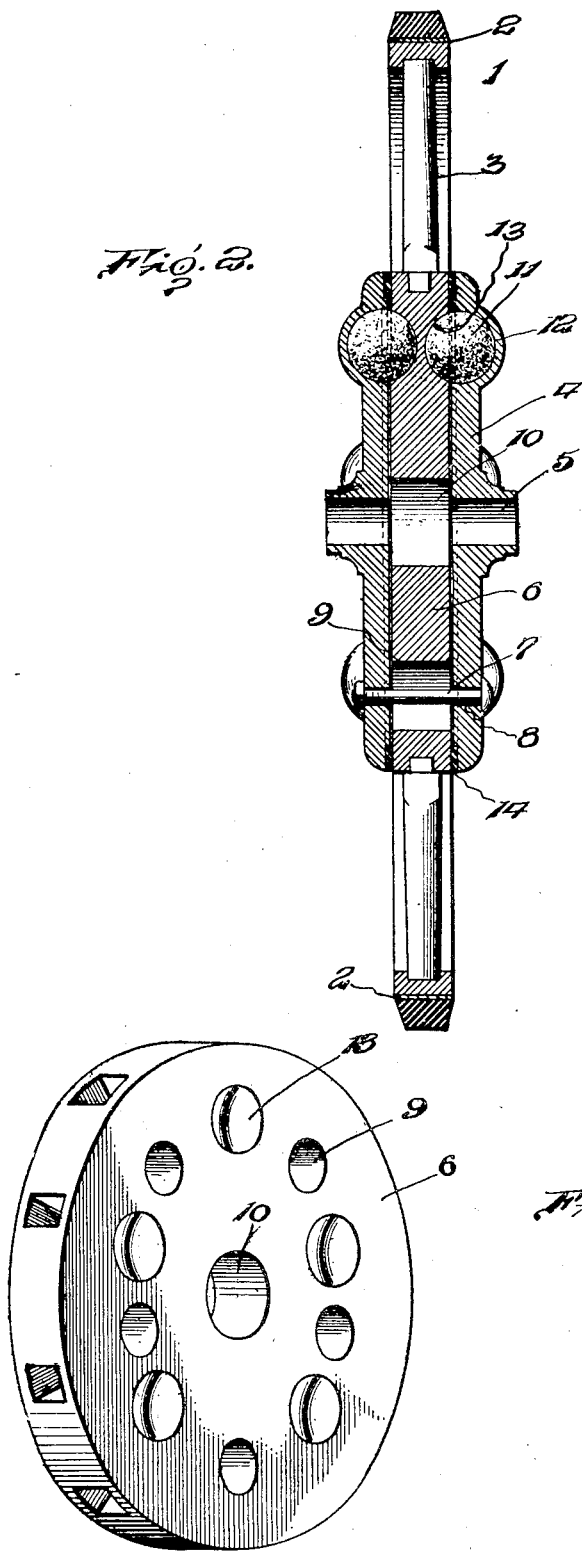

Be it known that I, LARKIN BRILES, a citizen of the United States, residing at Lake City, in the county of Modoc and State of California, have invented certain new and useful Improvements in Vehicle-Wheels, of which the following is a specification.

UNITED STATES PATENT OFFICE.

LARKIN BRILES, OF LAKE CITY, CALIFORNIA.

VEHICLE-WHEEL.

1,198,696.

Specification of Letters Patent. Patented Sept. 19, 1916.

Application filed June 30, 1916. Serial No. 106,815.

*To all whom it may concern:*

Be it known that I, LARKIN BRILES, a citizen of the United States, residing at Lake City, in the county of Modoc and State of California, have invented certain new and useful Improvements in Vehicle-Wheels, of which the following is a specification.

This invention relates to vehicle wheels of the cushion type and more particularly to that class embodying a floating hub section the movement of which is yieldably resisted so that the travel of the wheel over the road surface will be cushioned in substantially the same manner and substantially to the same degree as if a pneumatic tire were employed.

It is one aim of the present invention to provide a wheel of this type which will be substantial and durable and which while resilient will embody no pneumatic cushioning elements liable to become deflated.

Incidentally the invention aims to so construct and arrange the cushioning elements and the seats provided therefor that the elements will be subjected to minimum wear and may be adjusted from time to time so as to present a new wearing surface, thereby prolonging to a considerable extent the life of the said elements.

Another aim of the invention is to so construct the wheel that the same may be subjected to considerable shock without likelihood of injury to the cushioning elements or other parts of the wheel, the yielding movement of the relatively fixed and movable sections of the wheel being suitably limited for the purpose stated.

Another aim of the invention is to so construct the wheel and to provide cushioning elements of such form that the said elements may be readily and quickly removed and replaced or adjusted to present a new wearing surface, whenever desired.

In the accompanying drawings: Figure 1 is a side elevation of a wheel constructed in accordance with the present invention. Fig. 2 is a vertical sectional view through the said wheel, the plane of the section passing through the axis of the wheel. Fig. 3 is a side elevation of one of the members comprising the fixed hub section of the wheel. Fig. 4 is a perspective view of the floating hub section of the wheel.

In the drawings the numeral 1 indicates the felly of the wheel which may be of any suitable construction and provided with any suitable tire indicated by the numeral 2, the said felly being supported, as is usual, at the outer ends of the spokes 3 which radiate from the floating hub section of the wheel.

The wheel hub includes a fixed section and a floating section and the said fixed section comprises a pair of preferably circular plates indicated by the numeral 4, which plates are substantially of counterpart construction and provided with axially alined openings 5 to receive the axle spindle upon which the wheel is rotatably mounted. Except as will be presently explained, the opposing faces of the plates 4 comprising the fixed section of the hub are plane and oppose the plane faces of the floating hub section, which is indicated by the numeral 6, and from the periphery of which, as above stated, the spokes 3 radiate. The floating hub section is substantially of the same diameter as the plates 4 and the said section is designed to have movement between the plates 4 as is usual in wheels of this type. To limit such movement and also to connect the plates 4, bolts 7 are fitted through openings 8 formed at suitable intervals in an annular series concentric to the periphery of each plate 4 and these bolts pass through openings 9 formed at corresponding intervals in the floating hub section 6. The openings 8 are of a diameter to snugly receive the bolts 7 but the openings 9 are of greater diameter than the openings 8 so as to permit of movement of the floating hub section and yet limit such movement when the wheel receives impact with sufficient force to cause the walls of one or more of the openings to contact with the respective bolts for the purpose of limiting such movement, as stated above. The floating hub section is formed axially with an opening 10 which in the normal relative positions of the fixed and floating hub sections is in axial alinement with the openings 5. The opening 10 is, however, of greater diameter than the openings 5 and preferably of a greater diameter than the openings 9 so that the floating hub section may have movement with relation to the fixed section to the maximum extent without likelihood of the wall of the opening 10 coming in contact with the axle spindle passing therethrough.

Each of the cushioning elements is in the nature of a spherical body 11 of rubber or some other suitable material or a composition of rubber and another material or materials, and is preferably solid, and these elements are arranged in two annular series, each series being arranged between one of the plates 4 and the opposing side of the floating hub section 6, and the said elements are further alternated with the bolts 7, as clearly shown in Fig. 1 of the drawings. In order to accommodate the series of cushioning elements, the inner face of each plate 4 is formed with an annular series of seats 12 each of which is arranged to receive a portion of one of the cushioning elements, the said seat describing slightly more than a semi-sphere so that the cushioning elements may be arranged within the seats and be held frictionally therein while the respective plate 4 is being assembled with the floating hub section 6. The opposite side of each of the cushioning elements is received within a seat 13 which is formed in the face of the floating hub section 6. Each of the seats 13 describes less than a semi-sphere and it will, therefore, be understood that each receives the minor portion of the respective cushioning element whereas the corresponding seat 12 receives the major portion thereof. Therefore, it will be understood that when the cushioning elements become worn the side plates 4 may be removed and the said elements may then be rotated within the seats 12 so as to present a new portion of their surface and that this adjustment of the said elements may be made repeatedly before the elements become so worn as to require renewal. It will, of course, be understood that the movement of the floating section 6 between the fixed plates 4 is yieldably resisted by the cushioning elements 11 inasmuch as in such movement of the parts the seats 13 become displaced to a greater or less extent with relation to the respective seats 12.

In order to prevent the entrance of dirt and dust between the opposing faces of the floating section 6 and the fixed plates 4, each plate 4 is provided upon its inner face and at its periphery with an annular packing ring 14 of rubber or any other material suitable for the purpose, these rings contacting the opposite faces of the said floating section 6.

It will be understood, of course, that the cushioning elements absorb the shocks incident to sudden starting and stopping of the vehicle as well as cushioning the wheel in its ordinary travel.

Having thus described the invention, what is claimed as new is:

1. In a wheel of the class described, a fixed hub section, a floating hub section, one of the said sections being provided with seats describing more than a semi-sphere and the other section being provided with seats describing less than a semi-sphere, and a series of spherical cushioning elements disposed within the seats between the said sections.

2. In a wheel of the class described, a fixed hub section including spaced members provided in their inner faces each with a series of seats each describing more than a semi-sphere, a floating hub section disposed between the members of the first mentioned section and provided in its opposite faces with seats opposing the first mentioned seats and each describing less than a semi-sphere, and a series of cushioning elements disposed within the corresponding seats of the two series and between the said floating hub section and the members of the fixed section.

3. In a wheel of the class described, a fixed hub section including spaced members provided in their inner faces each with a series of seats each describing more than a semisphere, a floating hub section disposed between the members of the first mentioned section and provided in its opposite faces with seats opposing the first mentioned seats and each describing less than a semi-sphere, a series of cushioning elements disposed within the corresponding seats of the two series and between the said floating hub section and the members of the fixed section, the floating hub section being provided with a series of openings, and a series of bolts secured through the members of the fixed section and extending through the openings in the floating section.

In testimony whereof I affix my signature.

LARKIN BRILES. [L. S.]